Oct. 25, 1932.   G. STABILI   1,884,330
NONSKID DEVICE FOR PNEUMATIC TIRES
Filed Feb. 19, 1931   2 Sheets-Sheet 1
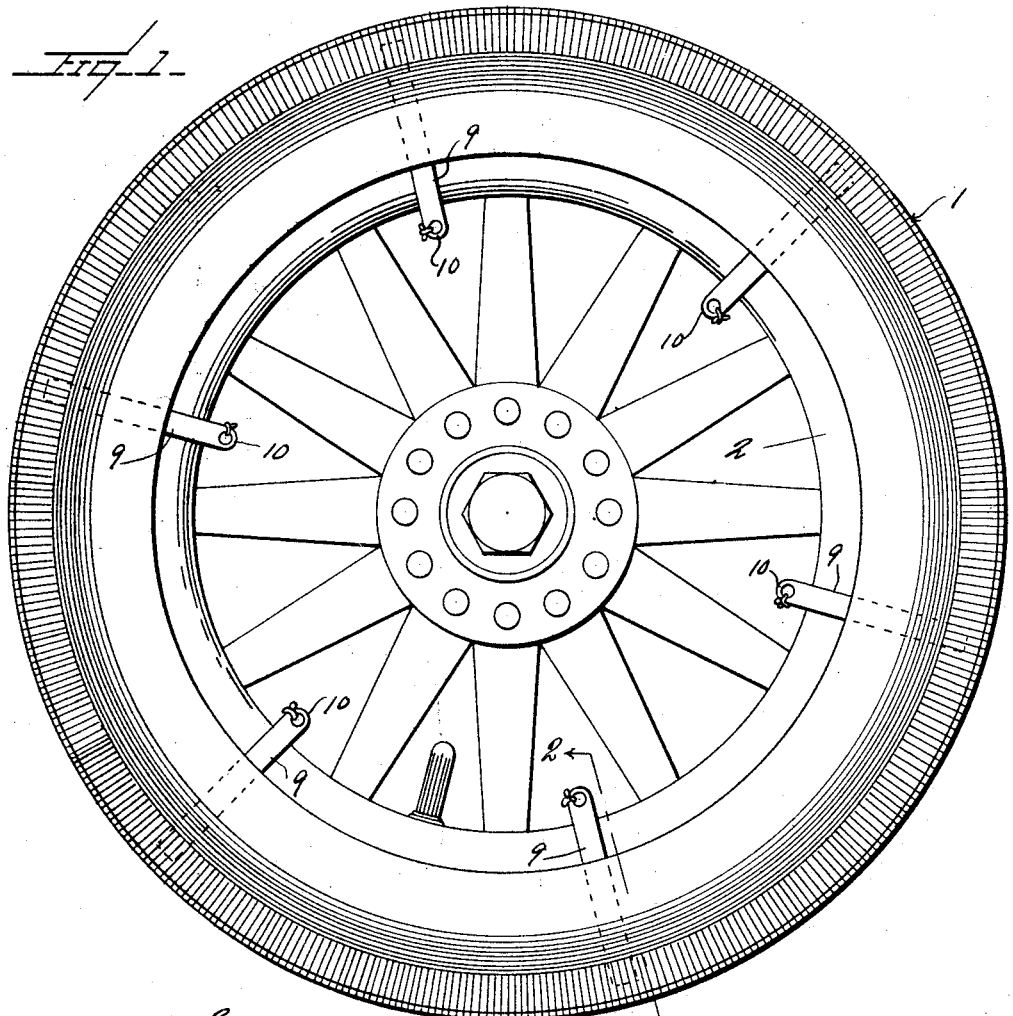
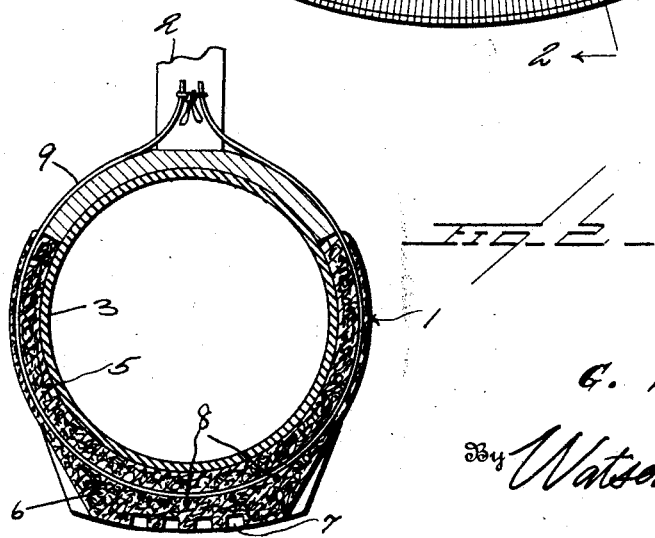
Inventor
G. Stabili
By Watson E. Coleman
Attorney

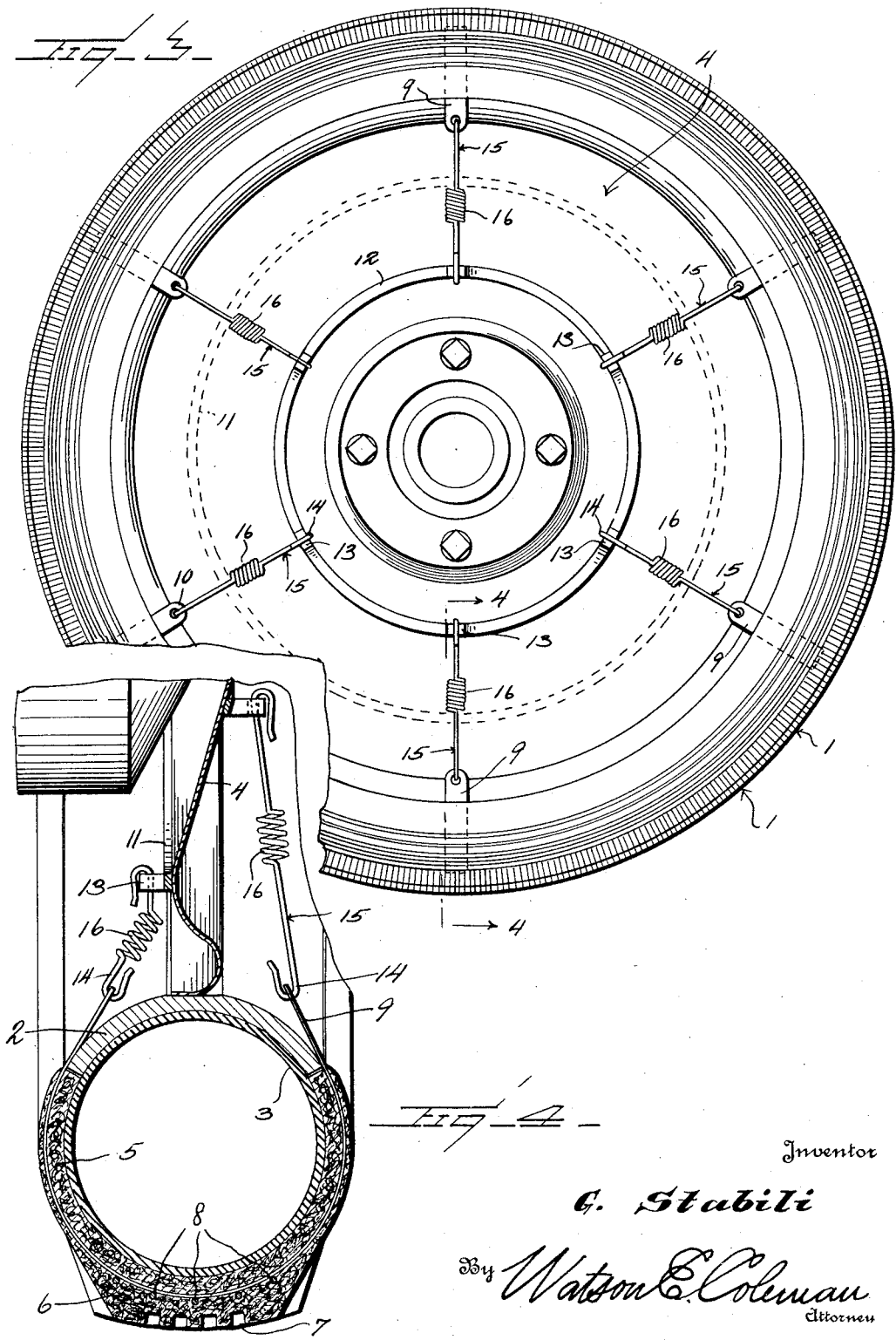

Patented Oct. 25, 1932

1,884,330

UNITED STATES PATENT OFFICE

GIOACCHINO STABILI, OF MORRISVILLE, PENNSYLVANIA

NONSKID DEVICE FOR PNEUMATIC TIRES

Application filed February 19, 1931. Serial No 517,017.

This invention relates to improvements in non-skid attachments for motor vehicle wheels, and pertains particularly to a device designed for application to a pneumatic tire wheel.

The primary object of the present invention is to provide a device for preventing the skidding of pneumatic tires, which is in the form of a casing designed to enclose the tire, the surface of the casing being provided with depressions or cups which will form suction contact with the road surface and thus prevent the wheel from skidding.

Another object of the invention is to provide a tire tread encasing body formed of compressed wood pulp, in which are embedded metallic filaments such, for example, as steel wool, which, when in contact with the road surface, particularly a smooth surface such as a concrete street, resist sliding movement of the body thereover and thus preventing skidding.

Still another object of the invention is to provide a non-skid device for attachment to pneumatic tires, which is formed to encase the tire and which has novel means associated therewith for securing it in position.

A still further object of the invention is to provide a device of the above described character which is very resistant to wear and which may be economically produced.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:—

Figure 1 is a view in side elevation of a motor vehicle wheel equipped with the device embodying the present invention.

Figure 2 is a view in cross section of the wheel taken on the line 2—2 of Figure 1.

Figure 3 is a view in side elevation of a disk wheel showing the present device applied thereto.

Figure 4 is a sectional view taken on the line 4—4 of Figure 3.

Referring more particularly to the drawings, wherein like numerals of reference indicate corresponding parts throughout the several views, the numeral 1 indicates generally the device embodying the present invention, the same being shown applied to a spoked wheel, which is conventionally shown and designated by the numeral 2 and upon which is shown a conventional representation of a tire 3 of the pneumatic type.

In Figures 3 and 4 the non-skid device is shown applied to a wheel of the disk type, this wheel being indicated generally by the numeral 4.

The device is formed of wood pulp material having embedded therein steel wool, particles of which are shown and indicated by the numerals 5. The body of the device, which in cross-section generally conforms to the curvature of the tire, is thickened over the area covering the tread of the tire, as indicated at 6, and the outer face of this thickened portion is provided with pockets 7 which serve as suction cups and thus assist in preventing the skidding of the device over a smooth surface. The steel wool particles which are exposed on the tread face also resist skidding through their tendency to cut or bite into the surface against which they are pressed. The body of the device also has embedded therein the circumferentially extending wires 8 which serve to reinforce and assist it in maintaining its shape.

As shown in the cross-sectional views of the non-skid device, the edges thereof extend a short distance beyond the transverse center of the tire so that, in addition to the covering of the tire tread, the side walls thereof are also covered and protected against damage when the wheel is run through ice and snow and along deeply rutted roadways. The side wall portions of the device are relatively thin and are somewhat flexible so that the device may be more readily placed in position over the tire. If necessary, when placing the device on the tire the latter may be partially or completely deflated so that it can be more readily inserted into the protecting cover.

Embedded in the body of the device are the circumferentially extending straps 9, the ends of which pass through and project from the edges of the body, as shown, so that when the device is in position on a tire they may extend across the felloe of the wheel to be connected together in any suitable manner as, for example, by passing a rope or other suitable element through the apertured ends 10 thereof. As shown, the wires 8 lie between the straps and the tread surface and in contact with or close proximity to the straps. The straps, therefore, serve to prevent the wires cutting through the body when heavy pressure is placed thereon.

Where the device is to be employed upon a disk wheel, such as is shown in Figures 3 and 4, the inner and outer surfaces have secured thereto the ring members 11 and 12 with which are integrally formed the outwardly projecting apertured lugs 13. After the non-skid device has been placed in position on the tire on the disk wheel the apertured ends of the straps 9 may have connected therewith one of the hooks 14 of the two hook members 15 which are connected together by the spring 16, the other one of the hooks of each of these members being attached, as shown, to an adjacent lug 13.

From the foregoing description it will be readily seen that with a device of the character herein described applied to a motor vehicle tire, the same will be thoroughly protected against wear and damage, and the device will effectively prevent slipping of the tire over the road surface due to the provision of the suction cup surface thereof and of the abrasive material embedded therein.

Having thus described my invention, what I claim is:

An anti-skid device for pneumatic tires, comprising an annular casing formed of compressed wood pulp material having metallic fibres distributed therethrough and having a relatively thick tread portion and relatively thin and flexible side wall portions capable of being flexed to facilitate the application of the device to a tire, said casing in cross section defining more than a semicircle to form the side walls of a width to substantially cover the sides of a tire, the edge portions of the casing curving inwardly to engage and grip the tire above its center, reinforcing wires extending circumferentially of the device through the tread portion, and elongated flat attaching members extending transversely of and through the device from one side wall free edge to the other over the top of and in close proximity to the said wires for coaction therewith in reinforcing the casing, the said members having their ends extended beyond the said free edges and formed to facilitate their connection together, the said tread having recesses in its face forming suction cups.

In testimony where I hereunto affix my signature.

GIOACCHINO STABILI.